United States Patent
Shaffer et al.

(10) Patent No.: US 7,970,117 B2
(45) Date of Patent: Jun. 28, 2011

(54) METHOD AND SYSTEM FOR HANDLING CALLS AT AN AUTOMATIC CALL DISTRIBUTOR

(75) Inventors: Shmuel Shaffer, Palo Alto, CA (US);
Shantanu Sarkar, San Jose, CA (US);
Labhesh Patel, San Francisco, CA (US);
Aaron Tong, San Jose, CA (US);
Martin R. Eppel, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1214 days.

(21) Appl. No.: 11/184,109

(22) Filed: Jul. 18, 2005

(65) Prior Publication Data
US 2007/0036131 A1     Feb. 15, 2007

(51) Int. Cl.
*H04M 5/00*     (2006.01)
(52) U.S. Cl. ......... 379/265.01; 379/265.02; 379/265.11; 379/265.12; 379/266.04
(58) Field of Classification Search ............. 379/266.01, 379/265.13, 203.01; 709/227, 204, 207
See application file for complete search history.

(56) References Cited

U.S. PATENT DOCUMENTS

| | | | |
|---|---|---|---|
| 5,884,032 A | 3/1999 | Bateman et al. ......... 395/200.34 |
| 6,163,607 A | 12/2000 | Bogart et al. ................. 379/266 |
| 6,173,053 B1 | 1/2001 | Bogart et al. ................. 379/266 |
| 6,311,231 B1 | 10/2001 | Bateman et al. .................. 710/5 |
| 6,314,178 B1 * | 11/2001 | Walker et al. ............ 379/266.01 |
| 6,425,012 B1 * | 7/2002 | Trovato et al. ................. 709/227 |
| 6,668,286 B2 | 12/2003 | Bateman et al. ................... 710/6 |
| 6,704,412 B1 | 3/2004 | Harris et al. .................. 379/269 |
| 7,415,417 B2 * | 8/2008 | Boyer et al. ...................... 705/1 |
| 7,426,268 B2 * | 9/2008 | Walker et al. ............ 379/266.01 |
| 2005/0025073 A1 * | 2/2005 | Kwan .......................... 370/260 |
| 2005/0190898 A1 * | 9/2005 | Priest et al. ................ 379/88.18 |
| 2006/0285670 A1 * | 12/2006 | Chin et al. .............. 379/201.01 |

OTHER PUBLICATIONS noHold, Inc. Data Sheet, http://www.nohold.com/demo/downloads/AtAGlance.pdf, 2 pages, Jul. 18, 2005.
noHold, Inc. Data Sheet, http://www.nohold.com/demo/downloads/AtAGlance.pdf, 2 pages, printed Jul. 17, 2005.

\* cited by examiner

*Primary Examiner* — Curtis Kuntz
*Assistant Examiner* — Joseph J Nguyen
(74) *Attorney, Agent, or Firm* — Baker Botts L.L.P.

(57) ABSTRACT

A method for handling calls at an automatic call distributor includes receiving from a first caller a first call for distribution to one of a plurality of agents and receiving from the first caller a first request associated with the first call. The method includes linking the first request to one or more additional requests associated with one or more additional calls from one or more additional callers. The method also includes distributing for handling to a first agent of the plurality of agents the first call and the one or more additional calls associated with the one or more additional requests linked to the first request.

31 Claims, 3 Drawing Sheets

METHOD AND SYSTEM FOR HANDLING CALLS AT AN AUTOMATIC CALL DISTRIBUTOR

TECHNICAL FIELD OF THE INVENTION

This invention relates in general to communication systems and, more particularly, to a method and system for handling calls at an automated call distributor.

BACKGROUND OF THE INVENTION

Automatic call distributors (ACDs) are specialized call center systems designed to match incoming requests for service, for example a telephone call or an e-mail, with a resource that is able to provide that service, for example a human call center agent. ACDs generally perform one or more of the following functions: (i) recognize and answer incoming calls; (ii) review database(s) for instructions on what to do with a particular call; (iii) using these instructions, identify an appropriate agent and queue the call, often times providing a prerecorded message; and (iv) connect the call to an agent as soon as the agent is available.

In most call centers, the number of questions being asked and answered is usually quantifiable and very often repetitive. Agents typically go through their days answering calls and often find themselves repeating their answers to similar queries. It is not unlikely that some might find themselves repeatedly answering the same questions from different callers within an ACD queue. In fact, depending on the type of call center, this situation can occur quite often for companies with specific or specialized services.

For example, in a technical support center specializing in answering calls for a single software product there may be common usage errors that often trigger calls to the center. Agents in this case answer similar questions for calls within the queue. The answers may have some variations based on caller queries but generally may be the same. However, having an agent to repeatedly answer similar questions for calls in a queue can be time consuming and inefficient.

NoHold.com presents a web based self-service support to answer common questions. The web interface is integrated with a knowledge base platform which is used to find answers to a user's question. If the solution cannot be found, then the user is required to go through a different communication medium (e.g., email, live contact center, etc) to find the solution. Cisco Systems uses a web portal to help users find the solutions to technical assistance center (TAC) questions. The portal asks a series of questions to guide a user to a specific problem for which he or she may be looking.

In some existing systems, callers reaching an agent not able to address the needs of the caller may be conferenced in with another agent or a supervisor who is better skilled in a specific area and who can then help the caller. During this interaction, the caller may interact with multiple agents and/or supervisors.

SUMMARY OF THE INVENTION

The present invention provides a method and system for handling calls at an automatic call distributor that substantially eliminates or reduces at least some of the disadvantages and problems associated with previous methods and systems.

In accordance with a particular embodiment, a method for handling calls at an automatic call distributor includes receiving from a first caller a first call for distribution to one of a plurality of agents and receiving from the first caller a first request associated with the first call. The method includes linking the first request to one or more additional requests associated with one or more additional calls from one or more additional callers. The method also includes distributing for handling to a first agent of the plurality of agents the first call and the one or more additional calls associated with the one or more additional requests linked to the first request.

Distributing for handling to the first agent of the plurality of agents the first call and the one or more additional calls may comprise joining the first caller, the one or more additional callers and the first agent in a conference which may comprise a chat group. Linking the first request to one or more additional requests may comprise receiving from the first agent a request to link the first request to the one or more additional requests and/or linking the first request to the one or more additional requests based on similarities in the first request and the one or more additional requests. The method may include requesting whether the first caller desires to join one or more other callers in the handling of the first request of the first caller and requesting whether the one or more additional callers desire to join another caller in the handling of the one or more additional requests of the one or more additional callers. The method may include presenting to the first caller a request list comprising requests from other callers, including the one or more additional requests, and receiving from the first caller a request to join in the handling of the one or more additional requests. Receiving from the first caller a first request associated with the first call may comprise receiving the first request through automatic speech recognition and/or through an interactive voice response system.

In accordance with another embodiment, a system for handling calls at an automatic call distributor includes an interface operable to receive from a first caller a first call for distribution to one of a plurality of agents and receive from the first caller a first request associated with the first call. The system includes a processor coupled to the interface and operable to link the first request to one or more additional requests associated with one or more additional calls from one or more additional callers and distribute for handling to a first agent of the plurality of agents the first call and the one or more additional calls associated with the one or more additional requests linked to the first request.

Technical advantages of particular embodiments include the optimization of answering and distribution of calls having similar requests by handling such calls together at one time. Live human agents may be used to actually answer the questions instead of depending on automation service which can sometimes degrade a caller's experience. For example, in many cases answers need to be varied for different, albeit similar requests, and a live agent can do so more easily than an automated answering process. In addition, callers in a queue can share conversations on common topics which can reduce call wait time without needing to add significant additional resources. Callers may be grouped according to their area of interest and are allowed to interact with agents as a group to accelerate the resolution of their issues. Callers who elect to participate in a group session may get priority treatment resulting in shorter wait times. Accordingly, customer satisfaction is increased from shorter wait times. Moreover, contact center cost of operation may be reduced by, for example, a reduction in 800 charges from shorter wait times.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

Figure 1:
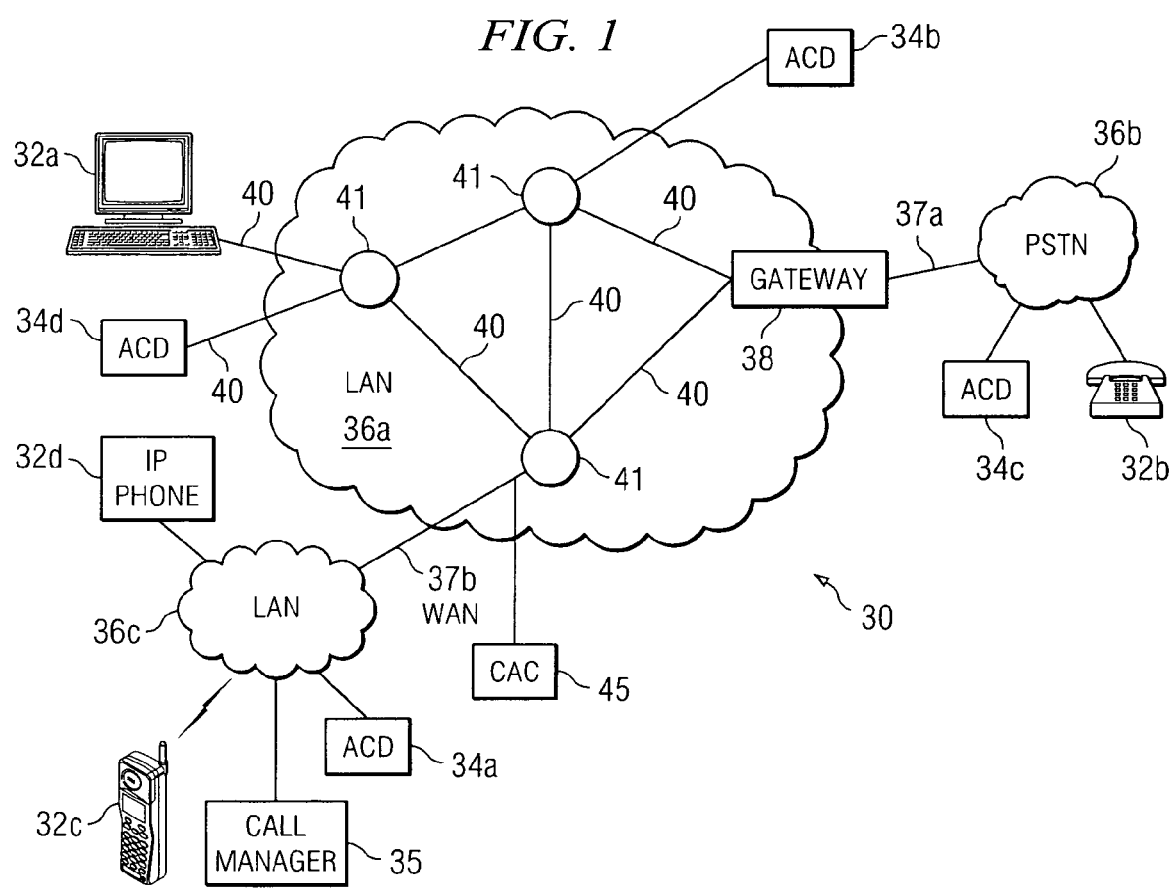
FIG. 1 illustrates a communication system including a plurality of endpoints operable to communicate among each other and a plurality of automatic call distributors, in accordance with a particular embodiment of the present invention.

FIG. 1 illustrates a communication system 30 including a plurality of endpoints 32a-32d having the ability to establish communication sessions between each other and/or automatic call distributors (ACDs) 34a-34d, using one or more of communication networks 36a-36c. ACDs 34a-34d are specialized communication systems designed to route incoming calls to available agents, so that calls are properly and/or evenly distributed. For the purposes of this specification, "automatic call distributor" or "ACD" shall refer to any combination of hardware, software and/or embedded logic which is operable to automatically distribute incoming calls, and "calls" shall include requests for service transmitted using any audio and/or video means, including signals, data or messages transmitted through voice devices, text chat, web sessions, facsimile, instant messaging and e-mail. ACDs 34a-34d may include call centers that receive incoming customer calls for distribution to agents and that place calls from agents to customers.

In particular embodiments, ACDs 34a-34d optimize the handling of calls having similar requests by distributing such calls to one agent to handle at the same time. Callers may elect to be conferenced in with other callers asking similar questions. In some cases, an ACD may automatically make decisions on whether particular requests should be grouped together for handling based on similarities. In some cases an agent or supervisor may make such decisions. Callers may also browse requests of other calls to determine whether to join in the handling of the other calls. Additional embodiments and functionality are further discussed below.

Call manager 35 includes any combination of hardware, software, and/or encoded logic that operates to receive and process calls to facilitate communication among agents and other users of system 30. In particular embodiments, call manager 35 may act as a private branch exchange (PBX) by supporting Internet Protocol (IP) PBX functions, such as hold, park, transfer, redirect, and/or other high level and low level call management features. For the processing of calls, call manager 35 maintains information on the agents and other users of system 30. For example, call manager 35 may maintain a listing, table, or other organization of information about agents of system 30. The information may include a name or other identifier for each agent. The information may also include contact information such as phone numbers and email addresses for the agents. When a call is received by call manager 35, call manager 35 and an ACD, such as ACD 34a, cooperate to receive, process, and distribute the call. For example, call manager 35 and/or ACD 34a may identify one or more agents that are available to receive the call.

In the illustrated embodiment, communication network 36a is a local area network (LAN) that enables communication between a plurality of endpoints 32a-32d and ACDs 34a-34d distributed across multiple cities and geographic regions. In another embodiment, a single, central ACD may be used, which distributes incoming calls to agents distributed across multiple cities and geographic regions. Communication network 36b is a public switched telephone network (PSTN) and couples endpoint 32b and ACD 34c with communication network 36a through gateway 38. Communication network 36c is another LAN, which couples endpoints 32c and 32d, ACD 34a and call manager 35 with communication network 36a. Accordingly, users of endpoints 32a-32d and ACDs 34a-34d can establish communication sessions between and among each network component coupled for communication with one or more of networks 36a-36c. Communication links 37a and 37b couple communication networks 36a and 36b, and communication networks 36a and 36c, respectively. In the illustrated embodiment, communication link 37b is a wide area network (WAN), which couples LANs 36a and 36c. A call admission control (CAC) system 45 may be used to monitor and manage the amount of bandwidth available over WAN 37b.

Communication network 36a includes a plurality of segments 40 and nodes 41 that couple endpoint 32a with ACDs 34b and 34d, gateway 38, and communication networks 36b-36c. Therefore, a user of endpoint 32a is provided with access to endpoints 32b-32d, and ACDs 34a-34d. Nodes 41 may include any combination of network components, gatekeepers, call managers, telephony servers, routers, hubs, switches, gateways, endpoints, or other hardware, software, or embedded logic implementing any number of communication protocols that allow for the exchange of packets in communication system 30.

Although the illustrated embodiment includes three communication networks 36a-36c, the term "communication network" should be interpreted as generally defining any network capable of transmitting audio and/or video telecommunication signals, data, and/or messages, including signals, data or messages transmitted through text chat, instant messaging and e-mail. Any one of networks 36a-36c may be implemented as a local area network (LAN), wide area network (WAN), global distributed network such as the Internet, Intranet, Extranet, or any other form of wireless or wireline communication network. Generally, network 36a provides for the communication of packets, cells, frames, or other portions of information (generally referred to as packets herein) between endpoints 32a-32d. Communication network 36a may include any number and combination of segments 40, nodes 41, endpoints 32a-32d, and/or ACDs 34a-34d.

In a particular embodiment, communication network 36a employs voice communication protocols that allow for the addressing or identification of endpoints, nodes, and/or ACDs coupled to communication network 36a. For example, using IP, each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data using frames or packets, are included within the scope of the present invention.

Network 36a may be directly coupled to other IP networks including, but not limited to, another LAN or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, at least endpoint 32d, ACDs 34a-34b, call manager 35, and gateway 38 are IP telephony devices. IP telephony devices have the ability of encapsulating a user's voice (or other input) into IP packets so that the voice can be transmitted over network 36a. IP telephony devices may include telephones, fax machines, computers running telephony software, nodes, gateways, wired or wireless devices, hand held personal digital assistants (PDAs), or any other device capable of performing telephony functions over an IP network.

In particular embodiments, communication system 30 may receive and transmit data in a session initiation protocol (SIP) environment. SIP is an application-layer control protocol that includes primitives for establishing, modifying, and terminating communication sessions. SIP works independently of underlying transport protocols and without dependency on the type of session that is being established. SIP also transparently supports name mapping and redirection services, which support personal mobility.

It will be recognized by those of ordinary skill in the art that endpoints 32a-32d, ACDs 34a-34d, call manager 35, and/or gateway 38 may be any combination of hardware, software, and/or encoded logic that provides communication services to a user. For example, endpoints 32a-32d may include a telephone, a computer running telephony software, a video monitor, a camera, an IP phone, a cell phone or any other communication hardware, software, and/or encoded logic that supports the communication of packets of media (or frames) using communication network 36a. Endpoints 32a-32d may also include unattended or automated systems, gateways, other intermediate components, or other devices that can establish media sessions. Although FIG. 1 illustrates a particular number and configuration of endpoints, ACDs, segments, nodes, call managers, and gateways, communication system 30 contemplates any number or arrangement of such components for communicating media.

Figure 2:
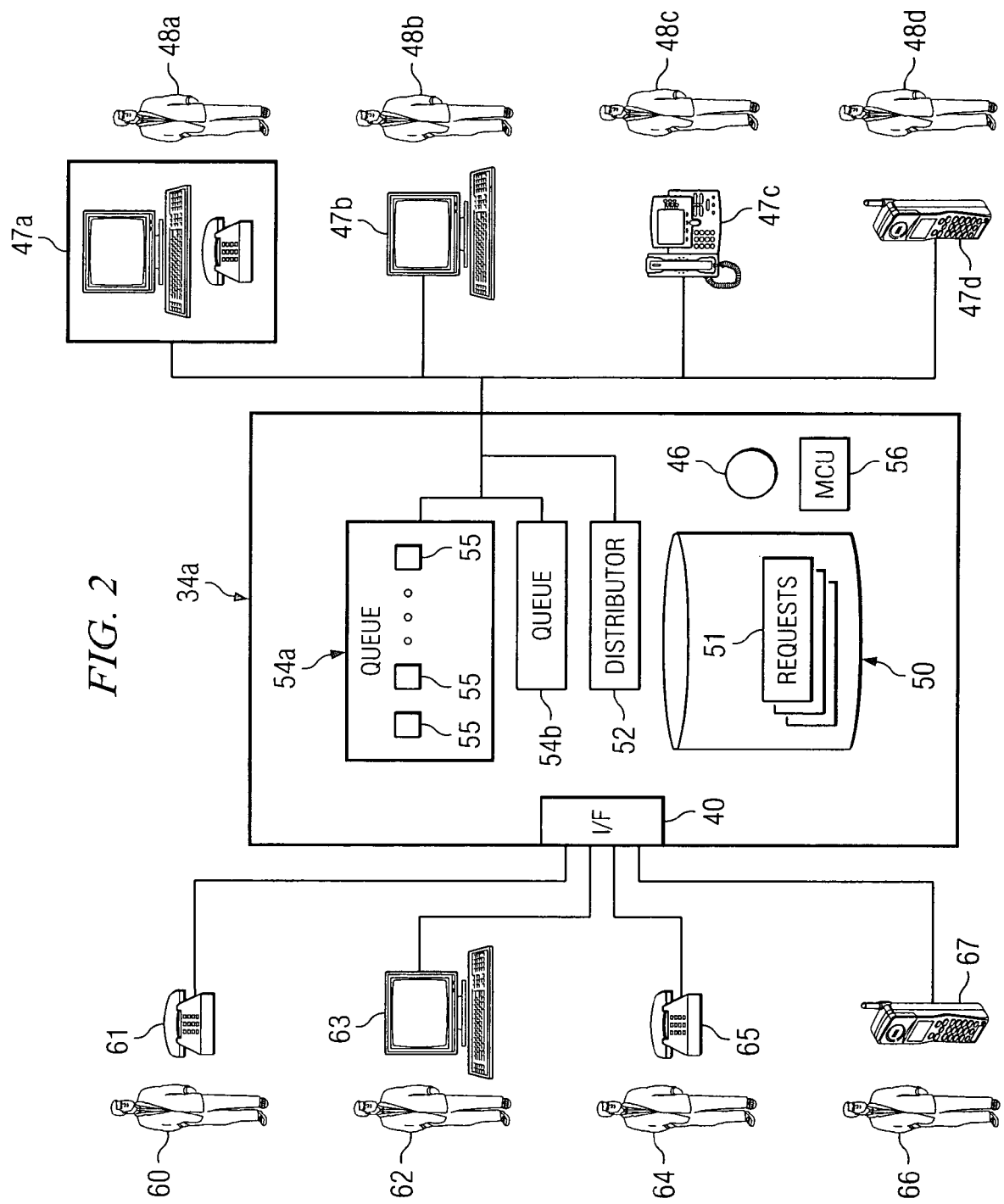
FIG. 2 illustrates an automatic call distributor of FIG. 1 in more detail, illustrating aspects of the present invention.

FIG. 2 illustrates ACD 34a in more detail, in accordance with a particular embodiment. ACD 34a includes an interface or input ports 40 which couple ACD 34a with other components of communication system 30. ACD 34a also includes a processor 46, memory module 50, distributor 52, queues 54a and 54b and a multipoint conference unit (MCU) 56.

When a call is received for processing by ACD 34a, a processor 46 may be used to determine which of a plurality of agents 48a-48d should receive the call using their associated endpoints 47a-47d, respectively. The identification of the available agent may be made by considering presence information relating to the availability of agents 48a-48d with respect to ACD 34a and communication system 30. Additionally or alternatively, the identification of the available agent may be made by considering agent information maintained by ACD 34a and/or call manager 35 of communication system 30. Agents 48a-48d may interact with ACD 34a through their endpoints, such as desktops, IP phones, mobile phones or other devices.

Processor 46 may be a microprocessor, controller, or any other suitable computing device or resource. Processor 46 works with other components of ACD 34a to provide the functionality of ACD 34a described herein. Memory module 50 may be any form of volatile or non-volatile memory including, without limitation, magnetic media, optical media, random access memory (RAM), read-only memory (ROM), removable media, or any other suitable local or remote memory component.

If a suitable agent is available to receive the incoming call, a distributor 52 of ACD 34a, working with processor 46, distributes the call to such agent for handling. Such handling may comprise, for example, connecting a caller of the call with the suitable agent if the call comprises a voice call or forwarding the call to the suitable agent if the call comprises, for example, an e-mail. If a suitable agent is not available, the call may be placed into a queue 54 in order to wait for an appropriate agent(s). In this embodiment, ACD 34a has two queues 54; however other embodiments of the present invention may have none, one or more than two queues 54. The selection of which queue 54 to place an incoming call may depend on the type of customer making the call, the type of service requested in the call or any other characteristic or condition relating to the call or ACD 34a. As illustrated, queue 54a includes calls 55 awaiting distribution to an agent. While a customer is waiting for an agent, ACD 34a may perform one or more of several functions including data collection from the user, playing of pre-recorded messages, or other automated process. As soon as a suitable agent becomes available, distributor 52 may distribute the call to the appropriate agent. Distributor 52 may comprise any suitable software, hardware or encoded logic and may provide its functionality through processor 46.

MCU 56 hosts, or accommodates, conferences between or among endpoints, such as endpoints 47a-47d, 61, 63, 65, 67. An MCU or other entity may be considered to be hosting a conference if it is one or more of the components that accommodates or otherwise provides conference resources to facilitate the conference, such as through a conference bridge and/or through a chat utility.

As indicated above, particular embodiments optimize the answering and distribution of calls having similar requests. As discussed below, automatic speech recognition (ASR) and MCUs may be utilized to provide this call handling functionality. As an example of one embodiment, caller 60 calls into ACD 34a and is prompted by the ACD to state his question or request. ACD 34a may store the query of caller 60 as a request 51 in memory module 50. In some embodiments, ASR technology may be used to translate the query into text or another format for storage. In some embodiments, ACD 34a may determine the caller's request through a series of questions to which the caller responds using any suitable interface. In some cases, IVR functionality may be used to receive answers from the caller to determine the caller's query. Caller 60 may be placed in queue 54a as a call 55, and the caller's stored request may be linked with the call 55 in queue 54a. Agents, such as agent 48*a* using endpoint 47*a*, may view the calls in the queue along with the calls' associated requests. The application displaying this information may include separate software running on endpoint 47*a* or may be integrated with ACD 34*a*. In addition to displaying each caller's question(s), ACD 34*a* may allow agent 48*a* to conference together calls from the queue with another, active call currently being serviced by the agent. For example, MCU 56 may be used to bridge together other callers with caller 60 and agent 48*a*. In some cases, conferencing calls together may comprise forming a chat group in which the multiple callers can participate. As a result of the functionality discussed above, if an agent finds calls with similar requests, he or she may decide to optimize the handling of these calls by conferencing these calls with the current active call.

In some embodiments, a special agent may be tasked with interacting with callers waiting in the queue and matching them into groups of similar requests. For example, the special agent may monitor requests of incoming calls and may actively group calls together for handling based on similarities in the call requests.

In some cases, the agent may first ask the primary caller (e.g., caller 60) if it is ok to simultaneously assist other callers with similar needs. Thus, the conference with the other caller(s) may only take place if caller 60 gives permission. In cases where privacy may not be an issue, caller 60 may agree and allow the agent to conference in calls with similar requests. Agent 48*a* may then answer the question(s) from these callers on the conference and may vary the responses for each caller if needed. After the questions are answered and the calls are appropriately handled, they may be dropped from the queue and disconnected. Thus, the number of calls having redundant requests may be reduced.

In some embodiments, ACD 34*a* may facilitate the grouping of callers with the same or similar requests. For example, caller 64 may call into ACD 34*a* and may be prompted for his requests. The request is then stored in memory module 50 as a request 51, using ASR or another method. ACD 34*a* associates the request with the caller's call 55 waiting in queue 54*a*. ACD 34*a* may then attempt to match the request 51 of caller 64, linked to the call 55 in the queue, with requests or queries of other contacts in the queue. If a match is found, ACD 34*a* may ask caller 64 if he would like to have his question answered along with one or more similar requests of other caller(s) to reduce his wait time in the queue. If caller 64 answers yes, then ACD 34*a* may internally group these calls 55 together. In some cases the request of caller 64 may match similar queries from several different groups of calls from different groups of callers. In this situation, caller 64 may be prompted to select a group that he would like to join for answering his question. At any point, caller 64 may choose not to join a group and wait longer in the queue for his turn to be connected with an agent. Within grouped calls, when a first call in the group is distributed to and answered by an ACD agent, the other calls linked with the distributed calls may be automatically conferenced in using, for example, MCU 56. The agent who receives the first call may be alerted of the conference and may handle the first and other calls appropriately. In some embodiments, an agent who receives a call may view the question associated with the call or group of calls through his endpoint before answering the call. In any embodiment in which a caller may join a call of another caller through conference because of similar requests 51, the caller may be allowed to maintain their position in the queue for a private session with an agent.

In particular embodiments, callers are provided the initial opportunity to allow other callers with similar requests to join their calls. Allowing other callers to join a call of another caller may benefit both caller and the ACD. Depending on the type of caller query, it may be beneficial if multiple callers team up to ask the same question. For example, if one caller wants to ask what the weather in a particular city is like, he probably would not mind if another caller joined in who had a similar question. The caller joining in may ask a secondary question such as, "What are the driving conditions to the particular city like" which may be important or helpful to the original caller as well. In addition, this functionality may better enable an ACD to meet its service level agreement requirements.

As another example, a caller who joins a conference about the alternative minimum tax may hear the questions of other callers and enhance his knowledge about the subject matter. Even if the caller's specific question is not addressed in the conference, his knowledge is enhanced which may lead to him refining his question to better enable an agent to provide a quicker and more accurate resolution. Many callers will get their answer by listening to ongoing discussions of other callers and therefore will not require private sessions with agents. Other callers may get answers to questions they may encounter in the future, such as answers with regard to a next phase of an IRS form. Thus, their next call might be averted. ACDs will benefit from implementing this functionality because callers will spend less time in queue and thus this will save on 800 numbers calls without hiring additional agents.

As another example in operation, caller 66 may call into ACD 34*a* and may be prompted for his question. ACD 34 may store the question as a request 51 in memory module 50. ACD 34*a*, through for example processor 46, may direct the caller to a menu option that displays all "public" requests of callers ahead of caller 66 in the queue. Public requests may include, for example, requests of callers who have allowed their requests to be public and their potential conversations with agents to be joinable by other callers. In some cases, however, an ACD or associated personnel may determine which caller requests should be public and joinable. In some cases, a caller may allow his conversation with an agent to be "public-listen only." In this case, if another caller joins the original caller's conversation with the agent, the other caller can listen on the conversation but cannot interrupt or speak with the agent. In some embodiments, a caller who allows his associated request to be public may receive priority over other callers awaiting distribution to an agent thereby receiving preferential treatment as a result. Preferential treatment, in any form such as customer perks or reduced queue wait time, may be offered in any embodiment to callers who agree to have their calls handled in conjunction with another call based on request similarities.

Continuing the above example, caller 66 may browse through a list of publicly-available requests 51 to see if there is one that matches his own request. If one is found, caller 66 may choose to join this inquiry. In some embodiments, ACD 34*a* may then check to make sure that the inquiry of caller 66 is similar to the one selected. In addition, in some cases ACD 34*a* may also notify the original caller of the selected inquiry to prompt the original caller to accept the request of caller 66 to join the stored inquiry. Once the original caller has accepted the request of caller 66 to join the inquiry and all verifications have been accepted, caller 66 is joined to the original caller and any other callers interested in this inquiry. In some embodiments, when the original caller of this group connects to an agent, all the calls in the group are automatically conferenced in through, for example, MCU 56.

If, on the other hand, caller 66 cannot find an inquiry similar to his, he can choose to remain in the queue to wait for the next available agent. At this point, ACD 34*a* may ask if he would like to make his conversation with the agent sharable for other callers in the queue. If caller 66 replies yes, then ACD 34*a* may identify the request 51 of caller 66 as public. If the caller answers no, then the request may be identified as private. In addition, in some cases, a caller may have the option of identifying his request as public-listen only.

In particular embodiments, a caller who calls into ACD 34*a*, and ACD 34*a* asks if it is okay for the caller's conversations with an agent to be multicast for the public use by others in the ACD queue. If the callers answers yes, then ACD 34*a* may start a multicast channel of the caller's live interaction with the agent. If a new caller's request matches that of the caller whose conversation is being multicast (e.g., as determined by the new caller, an agent, the ACD or otherwise), the new caller can join in the multicast channel.

As discussed above, in particular embodiments a single ACD agent may handle a plurality of callers at the same time. The ability for an agent to handle multiple ACD calls at the same time opens many new opportunities and greater efficiency for call centers. For example, in a medical situation when a caller indicates that he has a diabetes related question, he may be offered an opportunity to join a session with numerous other callers who have similar concerns or wait 20 minutes for a private session. If the caller elects to join a session with the agent and plurality of other callers, the call center saves resources by handling multiple callers simultaneously. The agent may have to repeat the overview only once for multiple callers. In addition, the callers get their questions addressed faster and may also benefit from the questions of other callers. In any of the above described examples, it is recognized that ACD 34*a* may track and keep records of the handling of ACD calls, including the time saved by grouping multiple calls together for handling. Records may then be provided to managers and supervisors of the ACD on a real-time or historical basis. The records may be used to make decisions about the staffing of the call center, the ACD's ability to meet service level requirements, the response time (s) of a particular agent or group of agents, the offering of promotions or other benefits and other ACD related business decisions. The historical reports of such data may also be used for forecasting workforce planning.

It will be recognized by those of ordinary skill in the art that ACD 34*a* may include any number of processors or memory modules to accomplish the functionality and features described herein. The processor 46, memory module 50, queues 54, distributor 52 and/or MCU 56 associated with ACD 34*a* may be centrally located (local) with respect to one another, or distributed throughout communication system 30.

Figure 3:
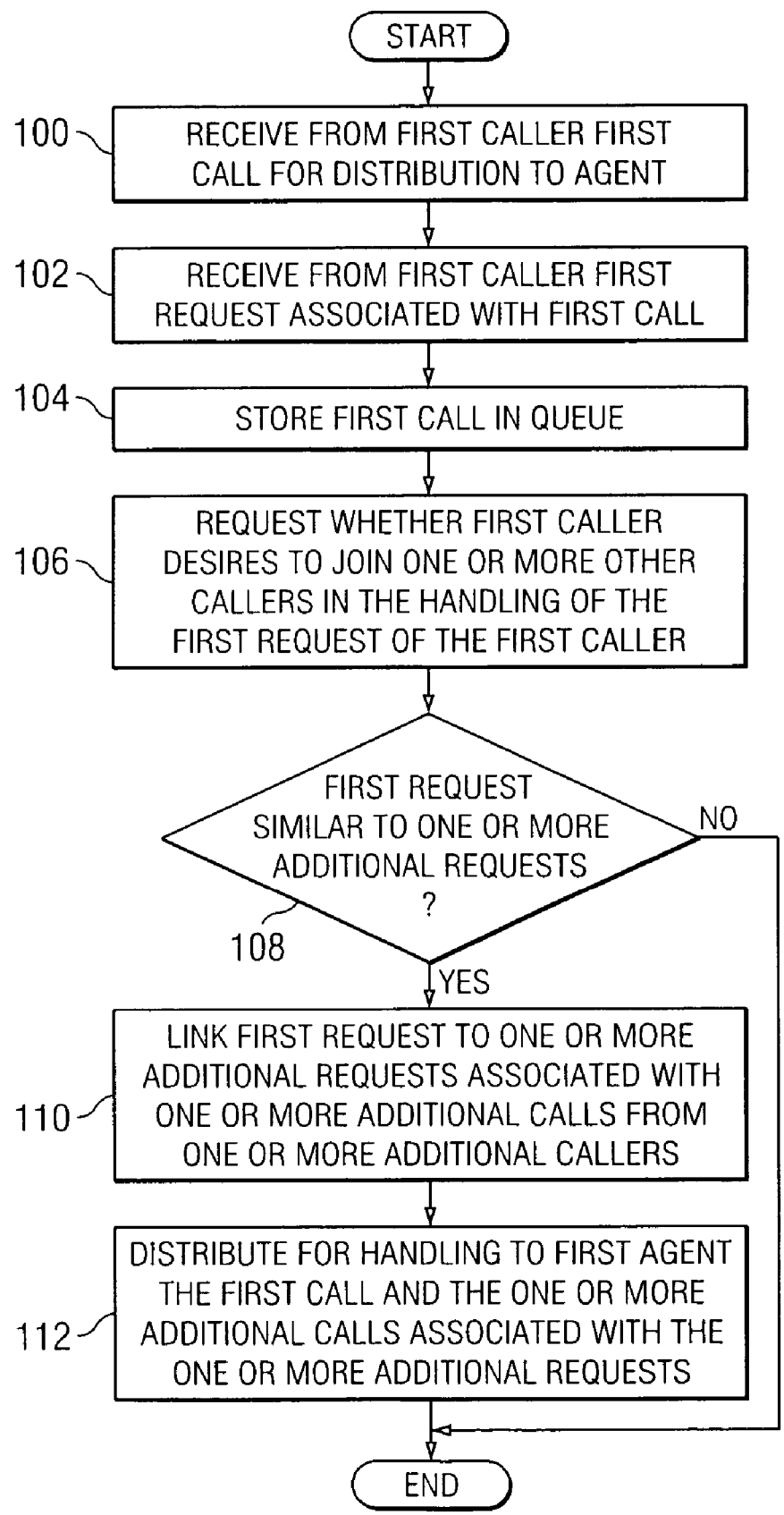
FIG. 3 illustrates a method for handling calls at an automatic call distributor, in accordance with an embodiment of the present invention.

FIG. 3 is a flowchart illustrating a method for handling calls at an automatic call distributor, in accordance with a particular embodiment. The method begins at step 100 where a first call is received from a first caller for distribution to an agent. At step 102, a first request associated with the first call is received from the first caller. The first request may comprise any type of request for service or question. The first request may be received from the first caller through automatic speech recognition, through an interactive voice response system or in any other manner. In some cases, the first request may be received at a special agent interacting with the first caller to determine the request. At step 104, the first call associated with the first request is stored in a queue, such as a queue of an automatic call distributor.

At step 106, the first caller is requested whether he desires to join on or more other callers in the handling of the first request. In some embodiments, the first caller may not be prompted for such decision. In particular embodiments, such a desire of a first caller may be known before receipt of the first caller based on customer records. At step 108, it is determined whether the first request is similar to one or more additional requests. For example, the first request may be the same or similar to one or more additional requests associated with other calls stored in a queue and waiting for a connection with an agent. In some cases the first request may be similar to another request associated with a call currently being handled by an agent. The determination of whether one request is similar to another may be made by an agent, automatically by a processor, by a supervisor, by a caller or by any other suitable person or system. Similarly, criteria used in making such a decision of whether multiple requests are similar may be set by any suitable person or system.

If it is determined that the first request is similar to one or more additional requests, then at step 110 the first request is linked to one or more additional requests associated with one or more additional calls from one or more additional callers. As indicated above, this linking may be performed by a processor according to any suitable criteria or instructions or by an agent, the first caller or other personnel. In some cases, a special agent interacting with the first caller may request a processor to link the first request to one or more additional requests based on his interactions with the first caller. At step 112, the first call and the one or more additional calls associated with the linked one or more additional requests are distributed for handling to a first agent. Such distribution may comprise initiating a conference between the first caller, the one or more additional callers and the first agent. In some cases, the conference may comprise a group chat. In some situations, the one or more additional calls may already be in the process of being handled by the first agent, and the first caller may join such handling through a conference. As indicated above, in some embodiments the first caller may be able to browse requests of other callers for grouping for handling together.

Some of the steps illustrated in FIG. 3 may be combined, modified or deleted where appropriate, and additional steps may also be added to the flowchart. Additionally, steps may be performed in any suitable order without departing from the scope of the invention.

As indicated above, technical advantages of particular embodiments of the present invention include the optimization of answering and distribution of calls having similar requests by handling such calls together at one time. Live human agents may be used to actually answer the questions instead of depending on automation service which can sometimes degrade a caller's experience. For example, in many cases answers need to be varied for different, albeit similar requests, and a live agent can do so more easily than an automated answering process. In addition, callers in a queue can share conversations on common topics which can reduce call wait time without needing to add significant additional resources. Callers may be grouped according to their area of interest and are allowed to interact with agents as a group to accelerate the resolution of their issues. Callers who elect to participate in a group session may get priority treatment resulting in shorter wait times. Accordingly, customer satisfaction is increased from shorter wait times. Moreover, contact center cost of operation may be reduced by, for example, a reduction in 800 charges from shorter wait times.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and automatic contact distributor 34a, these elements may be combined, rearranged or positioned in order to accommodate particular routing architectures or needs. In addition, any of these elements may be provided as separate external components to communication system 30, automatic contact distributor 34a or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for handling calls at an automatic call distributor, comprising:
   receiving from a first caller a first call for distribution to one of a plurality of agents;
   receiving from the first caller a first request associated with the first call;
   linking the first request to one or more additional requests associated with one or more additional calls from one or more additional callers; and
   receiving from the first caller an indication that the first caller is willing to participate in a group session with the one or more additional callers;
   in return for receiving the indication that the first caller is willing to participate in the group session, prioritizing the first call over one or more other calls in a queue received before the receipt of the first call and waiting to be handled by an agent of the plurality of agents;
   distributing for handling in a conference to a first agent of the plurality of agents the first call and the one or more additional calls associated with the one or more additional requests linked to the first request by joining the first caller, the one or more additional callers and the first agent in a conference in which the first caller, the one or more additional callers, and the first agent can communicate.

2. The method of claim 1, wherein the conference comprises a chat group.

3. The method of claim 1, wherein linking the first request to one or more additional requests comprises receiving from the first agent a request to link the first request to the one or more additional requests.

4. The method of claim 1, wherein linking the first request to one or more additional requests comprises linking the first request to the one or more additional requests based on similarities in the first request and the one or more additional requests.

5. The method of claim 1, further comprising requesting whether the first caller desires to join one or more other callers in the handling of the first request of the first caller.

6. The method of claim 1, further comprising requesting whether the one or more additional callers desire to join another caller in the handling of the one or more additional requests of the one or more additional callers.

7. The method of claim 1, further comprising:
   presenting to the first caller a request list comprising requests from other callers, including the one or more additional requests; and
   receiving from the first caller a request to join in the handling of the one or more additional requests.

8. The method of claim 1, wherein the one or more additional calls associated with the one or more additional requests are stored in a queue.

9. The method of claim 1, wherein distributing for handling to a first agent of the plurality of agents the first call and the one or more additional calls comprises:
   distributing for handling to the first agent the one or more additional calls;
   retrieving the first call from a queue; and
   distributing the first call to the first agent while the first agent is handling the one or more additional calls.

10. The method of claim 1, wherein receiving from the first caller a first request associated with the first call comprises receiving the first request through automatic speech recognition.

11. The method of claim 1, wherein receiving from the first caller a first request associated with the first call comprises receiving the first request through an interactive voice response system.

12. The method of claim 1, wherein:
   receiving from the first caller a first request associated with the first call comprises receiving from the first caller the first request at a special agent;
   linking the first request to one or more additional requests comprises receiving from the special agent a request to link the first request to the one or more additional requests; and
   distributing for handling to a first agent of the plurality of agents the first call and the one or more additional calls associated with the one or more additional requests linked to the first request comprises receiving a request from the special agent to distribute for handling to the first agent the first call and the one or more additional calls.

13. The method of claim 1, further comprising providing preferential treatment to the first caller in response to receiving consent from the first caller to join one or more other callers in the handling of the first request of the first caller.

14. A system for handling calls at an automatic call distributor, comprising:
   an interface operable to:
   receive from a first caller a first call for distribution to one of a plurality of agents; and
   receive from the first caller a first request associated with the first call;
   receive from the first caller an indication that the first caller is willing to participate in a group session with one or more additional callers;
   a processor coupled to the interface and operable to:
   in return for receiving the indication that the first caller is willing to participate in the group session, prioritize the first call over one or more other calls in a queue received before the receipt of the first call and waiting to be handled by an agent of the plurality of agents;
   link the first request to one or more additional requests associated with one or more additional calls from the one or more additional callers; and
   distribute for handling in a conference to a first agent of the plurality of agents the first call and the one or more additional calls associated with the one or more additional requests linked to the first request by joining the first caller, the one or more additional callers and the first agent in a conference in which the first caller, the one or more additional callers, and the first agent can communicate.

15. The system of claim 14, wherein the conference comprises a chat group.

16. The system of claim 14, wherein a processor operable to link the first request to one or more additional requests comprises a processor operable to receive from the first agent a request to link the first request to the one or more additional requests.

17. The system of claim 14, wherein a processor operable to link the first request to one or more additional requests comprises a processor operable to link the first request to the one or more additional requests based on similarities in the first request and the one or more additional requests.

18. The system of claim 14, wherein the processor is further operable to request whether the first caller desires to join one or more other callers in the handling of the first request of the first caller.

19. The system of claim 14, wherein the processor is further operable to request whether the one or more additional callers desire to join another caller in the handling of the one or more additional requests of the one or more additional callers.

20. The system of claim 14, wherein the interface is further operable to:
present to the first caller a request list comprising requests from other callers, including the one or more additional requests; and
receive from the first caller a request to join in the handling of the one or more additional requests.

21. The system of claim 14, wherein the one or more additional calls associated with the one or more additional requests are stored in a queue.

22. The system of claim 14, wherein a processor operable to distribute for handling to a first agent of the plurality of agents the first call and the one or more additional calls comprises a processor operable to:
distribute for handling to the first agent the one or more additional calls;
retrieve the first call from a queue; and
distribute the first call to the first agent while the first agent is handling the one or more additional calls.

23. The system of claim 14, wherein an interface operable to receive from the first caller a first request associated with the first call comprises an interface operable to receive the first request through automatic speech recognition.

24. The system of claim 14, wherein an interface operable to receive from the first caller a first request associated with the first call comprises an interface operable to receive the first request through an interactive voice response system.

25. The system of claim 14, wherein:
an interface operable to receive from the first caller a first request associated with the first call comprises an interface operable to receive from the first caller the first request at a special agent;
a processor operable to link the first request to one or more additional requests comprises a processor operable to receive from the special agent a request to link the first request to the one or more additional requests; and
a processor operable to distribute for handling to a first agent of the plurality of agents the first call and the one or more additional calls associated with the one or more additional requests linked to the first request comprises a processor operable to receive a request from the special agent to distribute for handling to the first agent the first call and the one or more additional calls.

26. The system of claim 14, wherein the processor is further operable to provide preferential treatment to the first caller in response to receiving consent from the first caller to join one or more other callers in the handling of the first request of the first caller.

27. A system for handling calls at an automatic call distributor, comprising:
means for receiving from a first caller a first call for distribution to one of a plurality of agents;
means for receiving from the first caller a first request associated with the first call;
means for linking the first request to one or more additional requests associated with one or more additional calls from one or more additional callers; and
means for receiving from the first caller an indication that the first caller is willing to participate in a group session with the one or more additional callers;
means for, in return for receiving the indication that the first caller is willing to participate in the group session, prioritizing the first call over one or more other calls in a queue received before the receipt of the first call and waiting to be handled by an agent of the plurality of agents;
means for distributing for handling in a conference to a first agent of the plurality of agents the first call and the one or more additional calls associated with the one or more additional requests linked to the first request by joining the first caller, the one or more additional callers and the first agent in a conference in which the first caller, the one or more additional callers, and the first agent can communicate.

28. Logic embodied in a non-transitory computer readable medium, the computer readable medium comprising code operable to:
receive from a first caller a first call for distribution to one of a plurality of agents;
receive from the first caller a first request associated with the first call;
link the first request to one or more additional requests associated with one or more additional calls from one or more additional callers; and
receive from the first caller an indication that the first caller is willing to participate in a group session with the one or more additional callers;
in return for receiving the indication that the first caller is willing to participate in the group session, prioritize the first call over one or more other calls in a queue received before the receipt of the first call and waiting to be handled by an agent of the plurality of agents;
distribute for handling in a conference to a first agent of the plurality of agents the first call and the one or more additional calls associated with the one or more additional requests linked to the first request by joining the first caller, the one or more additional callers and the first agent in a conference in which the first caller, the one or more additional callers, and the first agent can communicate.

29. A method for handling calls at an automatic call distributor, comprising:
receiving from a first caller a first call for distribution to one of a plurality of agents;
receiving from the first caller a first request associated with the first call;
distributing the first call to a first agent of the plurality of agents for handling by the first agent;
receiving one or more additional calls from one or more additional callers, the one or more additional calls comprising one or more additional requests;
placing the one or more additional calls in a queue;
linking the first request to the one or more additional requests; and removing the one or more additional calls based on the linking before the one or more additional calls reach a front of the queue;

distributing the one or more additional calls to the first agent while the first agent is handling the first call so that the first agent can handle first call and the one or more additional calls in a conference in which the first caller, the one or more additional callers, and the first agent can communicate.

30. The method of claim 29, further comprising requesting whether the first caller desires to join one or more other callers in the handling of the first request of the first caller.

31. A system for handling calls at an automatic call distributor, comprising:

an interface operable to:
 receive from a first caller a first call for distribution to one of a plurality of agents;
 receive from the first caller a first request associated with the first call; and
 receive one or more additional calls from one or more additional callers, the one or more additional calls comprising one or more additional requests; and a processor coupled to the interface and operable to:
 distribute the first call to a first agent of the plurality of agents for handling by the first agent;
 place the one or more additional calls in a queue;
 link the first request to the one or more additional requests; and
 remove the one or more additional calls based on the linking before the one or more additional calls reach a front of the queue; and
 distribute the one or more additional calls to the first agent while the first agent is handling the first call so that the first agent can handle first call and the one or more additional calls in a conference in which the first caller, the one or more additional callers, and the first agent can communicate.

\* \* \* \* \*